(12) United States Patent
Vila

(10) Patent No.: US 10,625,871 B1
(45) Date of Patent: Apr. 21, 2020

(54) DYNAMIC MOVEMENT TUBE CONNECTION SYSTEM

(71) Applicant: ROLLER BEARING COMPANY OF AMERICA, INC., Oxford, CT (US)

(72) Inventor: Smail Vila, Louisville, KY (US)

(73) Assignee: Roller Bearing Company of America, Inc., Oxford, CT (US)

( * ) Notice: Subject to any disclaimer, the term of this patent is extended or adjusted under 35 U.S.C. 154(b) by 269 days.

(21) Appl. No.: 15/330,214

(22) Filed: Aug. 23, 2016

Related U.S. Application Data

(60) Provisional application No. 61/967,069, filed on Aug. 24, 2015.

(51) Int. Cl.
*F16L 27/02* (2006.01)
*B64D 29/06* (2006.01)
*F16L 51/00* (2006.01)
*F16L 21/02* (2006.01)
*B64C 29/00* (2006.01)

(52) U.S. Cl.
CPC .............. *B64D 29/06* (2013.01); *F16L 21/02* (2013.01); *F16L 51/00* (2013.01); *B64C 29/0033* (2013.01)

(58) Field of Classification Search
CPC ......... F16L 27/026; F16L 27/06; F16L 51/00; B64D 29/06
USPC .............................................. 285/224, 145.1
See application file for complete search history.

(56) References Cited

U.S. PATENT DOCUMENTS

| 2,217,664 | A | * | 10/1940 | Berger | F01N 13/06 285/224 |
| 2,688,501 | A | * | 9/1954 | MacLeod | F01N 13/10 285/145.1 |
| 3,173,710 | A | * | 3/1965 | Kinnison | F16L 27/04 285/145.1 |
| 3,540,758 | A | * | 11/1970 | Torres | F16L 27/1133 24/279 |
| 3,596,934 | A | * | 8/1971 | De Cenzo | F16L 27/1136 285/145.1 |
| 3,787,079 | A | * | 1/1974 | Yorke | F16L 27/04 285/233 |
| 3,799,586 | A | * | 3/1974 | Caras | F16L 27/04 285/145.1 |
| 4,522,433 | A | * | 6/1985 | Valentine | F16L 27/026 285/233 |
| 4,558,871 | A | | 12/1985 | Pufal | |
| 5,435,489 | A | * | 7/1995 | Jenkins | F02K 1/28 239/265.17 |
| 6,079,670 | A | * | 6/2000 | Porte | B64D 15/04 165/170 |

(Continued)

FOREIGN PATENT DOCUMENTS

| CN | 103069128 A | 4/2013 |
| FR | 2637014 A1 | 3/1990 |
| WO | 2008069844 A2 | 6/2008 |

*Primary Examiner* — David Bochna
(74) *Attorney, Agent, or Firm* — Murtha Cullina LLP

(57) ABSTRACT

A tube connection system for an engine or aircraft includes a Coanda ring defining an annular tube segment which has a branch tube segment extending therefrom. A supply tube assembly defines a plurality of tube segments. Adjacent tube segments are moveably coupled to one another by one of a plurality of variable-positionable couplings. Another of the plurality of tube segments is moveably coupled to the branch segment by another of the plurality of variable-positionable couplings.

26 Claims, 8 Drawing Sheets

(56) References Cited

U.S. PATENT DOCUMENTS

| | | | | |
|---|---|---|---|---|
| 6,193,192 B1* | 2/2001 | Porte | ............. | F02C 7/047 |
| | | | | 244/134 B |
| 6,880,863 B2* | 4/2005 | Vila | ............. | F16L 27/047 |
| | | | | 277/616 |
| 6,905,144 B2* | 6/2005 | Vila | ............. | F16J 15/3212 |
| | | | | 277/589 |
| 7,883,094 B2* | 2/2011 | Vila | ............. | F16L 27/026 |
| | | | | 285/224 |
| 7,900,872 B2* | 3/2011 | Sternberger | ............. | B64D 33/02 |
| | | | | 244/134 C |
| 8,047,470 B2* | 11/2011 | Porte | ............. | B64D 15/04 |
| | | | | 244/134 B |
| 8,733,800 B1* | 5/2014 | Ruperte Sanchez | ... | F16L 27/04 |
| | | | | 285/224 |
| 2002/0027180 A1* | 3/2002 | Porte | ............. | B64D 15/04 |
| | | | | 244/134 R |
| 2013/0315721 A1 | 11/2013 | Lawson, Jr. et al. | | |
| 2015/0143816 A1 | 5/2015 | Salunkhe et al. | | |
| 2016/0032781 A1 | 2/2016 | Whitty et al. | | |
| 2016/0076397 A1 | 3/2016 | Eshak et al. | | |
| 2017/0145954 A1* | 5/2017 | Sutterfield | ............. | F02K 1/28 |

* cited by examiner

DYNAMIC MOVEMENT TUBE CONNECTION SYSTEM

CROSS REFERENCE TO RELATED APPLICATION

This application claims the benefit of U.S. Provisional Patent Application No. 61/967,069 filed on Aug. 24, 2015, the contents of which are incorporated herein by reference in its entirety.

TECHNICAL FIELD

This invention relates to a tube connection system configured for dynamic movement for use in aircraft and engines, such as, but not limited to, a Coanda assembly for a turbine powered engine for a tilt rotor aircraft, such as a Boeing® V-22 Osprey aircraft. In particular the tube connection system is an assembly having variable-positionable couplings for coupling adjacent tube sub-assemblies or supply tube segments to one another while allowing sealing movement to compensate for thermal expansion; lateral, angular and rotational movement; and structural, dynamic and vibration loads to which the supply tube segments and variable-positionable couplings are subject.

BACKGROUND

Known tube connection systems in aircraft and engines, such as, but not limited to, Coanda supply tube designs, utilize bellows joints and/or joints built as combination of bellows and carbon seals. Such seals cannot withstand system generated dynamic loads thereby causing premature failure. Moreover, bellows joints are not very responsive to lateral or angular articulations and have limited benefit in compensating for twisting articulations in combination with dynamic loads and vibrations. Thus, bellows joints can become fatigued and fail catastrophically. Bellows joints also cannot withstand axial torque which is transferred through the system.

Carbon seal based joints are sensitive to dynamic loads and vibrations. Under dynamic offset conditions carbon based seals typically fail causing excessive joint wear. Failure of those joints cause system leakage and efficiency decreases. Tube connections systems are subject to failure. For example, tube connections systems employed in Coanda systems can fail, which increases infrared radiation and causes damage to the area directly beneath the exhaust ducts.

Based on the foregoing, there is a need to provide improved tube connection systems for use in aircraft and engines including, but not limited to, use in Coanda systems.

SUMMARY OF THE INVENTION

There is disclosed herein a tube connection system for an aircraft or engine, for example, a turbine powered engine for a tilt rotor aircraft, such as a Boeing® V-22 Osprey aircraft. The tube connection system includes a Coanda ring that has an annular tube segment. The annular tube segment has one or more (e.g., two, three or more) branch tube segments extending therefrom. The tube connection system includes one or more (e.g., two, three or more) supply tube assemblies, each defining a plurality of supply tube segments. Adjacent supply tube segments are movably coupled to one another by one of a plurality (e.g., two, three or more) of variable-positionable couplings. One of the plurality of supply tube segments is movably coupled to one of the branch tube segments by another of the plurality of variable-positionable couplings.

The variable-positionable couplings allow sealing movement to compensate for thermal expansion; lateral, angular and rotational movement; and structural, dynamic and vibration loads that the supply tube segments and variable-positionable couplings are subject to.

The variable-positionable couplings are secured to respective supply tube segments and branch tube segments via welding or brazing or may be formed integrally therewith. For example, manufacturing and processing techniques such as, but not limited to, tube forming, sheet metal forming, gas tungsten arc welding, brazing (e.g. furnace or gold/nickel tungsten inert gas brazing) electro-chemical etching, hand working, leak and pressure testing and non-destructive examination (e.g. fluorescent penetrant inspection).

DETAILED DESCRIPTION

Figure 1:
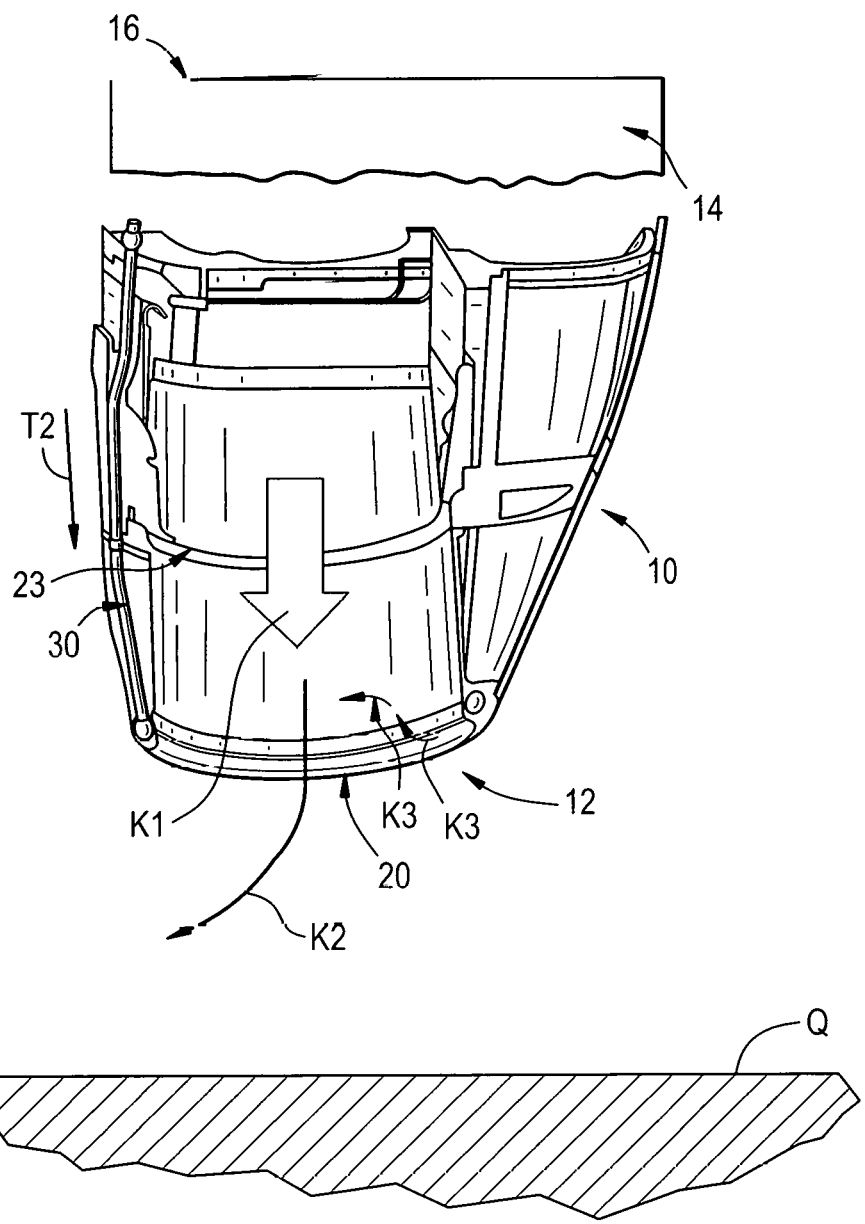
FIG. 1 is a cross sectional view of a portion of a nacelle for a turbine powered engine having a Coanda ring therein.

As shown in FIG. 1, a portion of a nacelle 10 for turbine powered engine 14 for a tilt rotor aircraft, such as a Boeing® V-22 Osprey aircraft is shown in a vertical position ready for hovering of the aircraft. The nacelle 10 defines an exhaust gas outlet 12 that is spaced apart from an upstream end 16 of the engine 14. A Coanda ring 20 is positioned in the exhaust gas outlet 12 for discharging pressurized air in a vortex enabling pattern as shown by the arrows K3 and for redirecting hot exhaust gases K1 through an interior area 23 in a direction away from a surface Q (e.g., a launching pad, runway apron or tarmac) located directly beneath the outlet 12, as shown by the arrow K2 to prevent excessive heat exposure to the surface Q. The Coanda ring 20 is supplied with a supply gas via a supply tube assembly 30. In one embodiment, the supply gas is provided from a bleed-off from a compressor section of the engine 14. The supply gas flows in the direction of the arrow T2 towards the Coanda ring 20. Supply of the gas to the Coanda ring assists in the cooling of the Coanda ring and improves performance of the Coanda ring in accomplishing the redirecting of the exhaust gas K1 in the direction of the arrow K2.

Figure 2A:
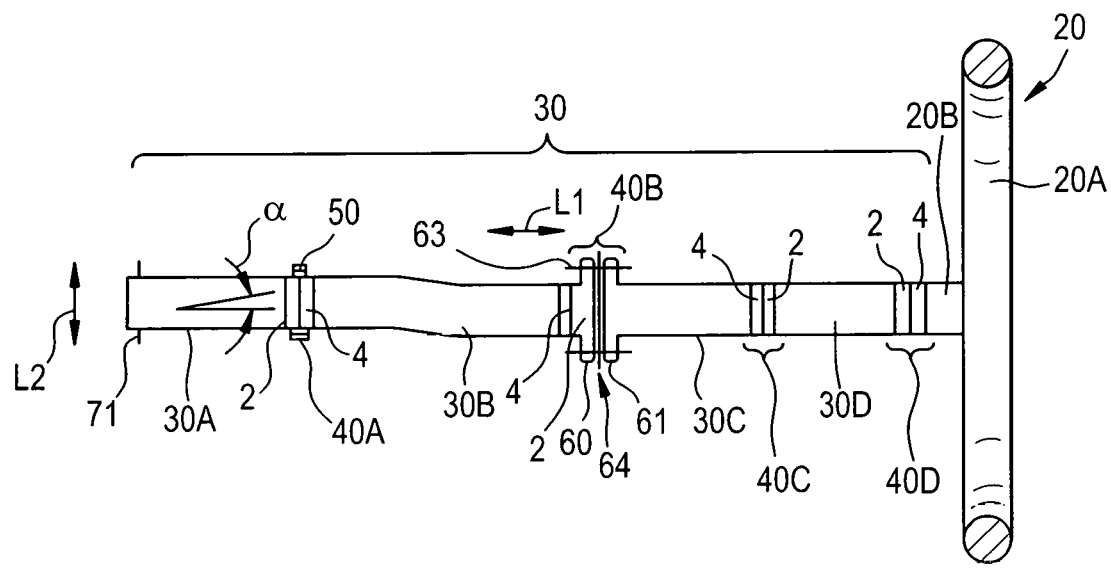
FIG. 2A is a schematic of a tubing assembly that is movably coupled to the Coanda ring using four variable-positionable couplings.

As shown schematically in FIG. 2A, the supply tube assembly 30 includes an inlet supply tube segment 30A (e.g., forward sub-assembly) movably coupled to a downstream-flanged supply tube segment 30B by a first variable-positionable coupling 40A. In one embodiment, the inlet supply tube segment 30A has a flange 71 secured thereto (e.g., welded to or machined integrally therewith) for securing the inlet supply tube segment 30A to another structure and/or other tube. The downstream-flanged supply tube segment 30B is movably coupled to a first flange 60 by a second variable-positionable coupling 40B. The first flange 60 sealably engages a second flange 61 on the upstream-flanged supply tube segment 30B, as set forth below. The upstream-flanged supply tube segment 30C is movably coupled to a downstream supply tube segment 30D (e.g., aft sub-assembly) by a third variable-positionable coupling 40C. The downstream supply tube segment 30D is movably coupled to a branch tube segment 20B (e.g., a Y-duct or T-tube segment) extending from an annular tube segment 20A of the Coanda ring by a fourth variable-positionable coupling 40D. The first variable-positionable coupling 40A, the second variable-positionable coupling 40B, the third variable-positionable coupling 40C and the fourth variable-positionable coupling 40D provide sealing movement between the respective first downstream-flanged supply tube segment 30A, the downstream-flanged supply tube segment 30B, the upstream-flanged supply tube segment 30C and the downstream supply tube segment 30D and the branch tube segment 20B to compensation for thermal expansion and vibration loads. The inlet supply tube segment 30A, the downstream-flanged supply tube segment 30B, the upstream-flanged supply tube segment 30C, the downstream supply tube segment 30D, the annular tube segment 20A, the branch tube segment 20B and the first through fourth 40A, 40B, 40C and 40D variable-positionable couplings are collectively referred to herein as a Coanda assembly.

The first through fourth 40A, 40B, 40C and 40D variable-positionable couplings are each configured for axial articulations to compensate for thermally induced movement, lateral articulations to compensate for misalignment of the tube segments and/or conical articulation to compensate for flexions and dynamic loads. The first through fourth 40A, 40B, 40C and 40D variable-positionable couplings are each configured to seal an interface between the respective variable-positionable coupling and at least one of the tube segments, the first flange 60, and the branch tube segment 20B.

Referring to FIG. 2A, each of the supply tube segments 30A, 30B, 30C and 30D is axially movable in relation to an adjacent one of the supply tube segments in a direction indicated by the arrow L1. The downstream supply tube segment 30D is axially movable in relation to the branch tube segment 20B in the direction indicated by the arrow L1. In one embodiment, each of the supply tube segments 30A, 30B, 30C and 30D is axially movable by plus or minus 6.35 mm (0.25 inches) minimum to plus or minus 25.4 mm (1.0 inches) maximum.

Referring to FIG. 2A, each of the supply tube segments 30A, 30B, 30C and 30D is laterally movable in relation to an adjacent one of the supply tube segments in a direction indicted by the arrow L2. The downstream supply tube segment 30D is laterally movable in relation to the branch tube segment 20B in the direction indicated by the arrow L2. In one embodiment, each of the supply tube segments 30A, 30B, 30C and 30D is laterally movable by plus or minus a minimum of 6.35 mm (0.25 inches).

Referring to FIG. 2A, each of the supply tube segments 30A, 30B, 30C and 30D is angularly movable (e.g., conical movement) in relation to an adjacent one of the supply tube segments in a direction indicted by the angle α. The downstream supply tube segment 30D is angularly movable in relation to the branch tube segment 20B in the direction indicated by the angle α. In one embodiment, each of the supply tube segments 30A, 30B, 30C and 30D is angularly movable by up to 5 degrees in a conical twisting manner.

Figure 5:
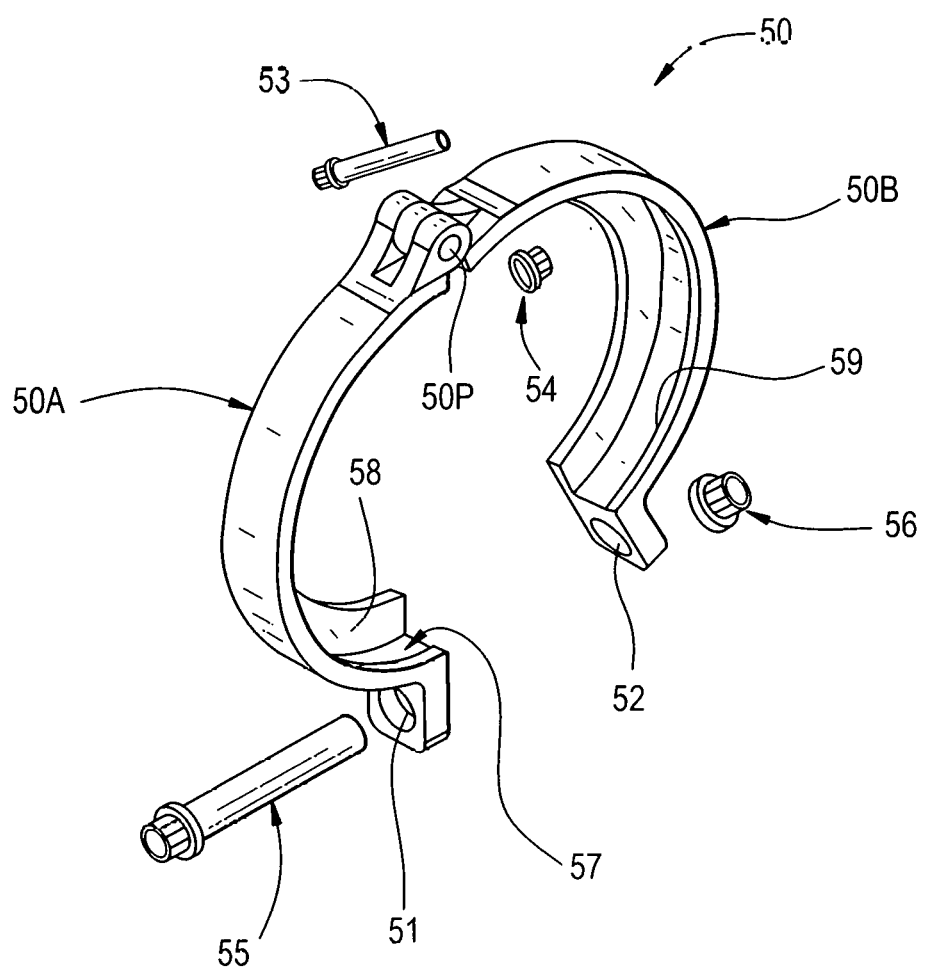
FIG. 5 is a perspective view of a retaining clamp employed in the tubing assembly of FIGS. 2A and 2B.
Figure 6:
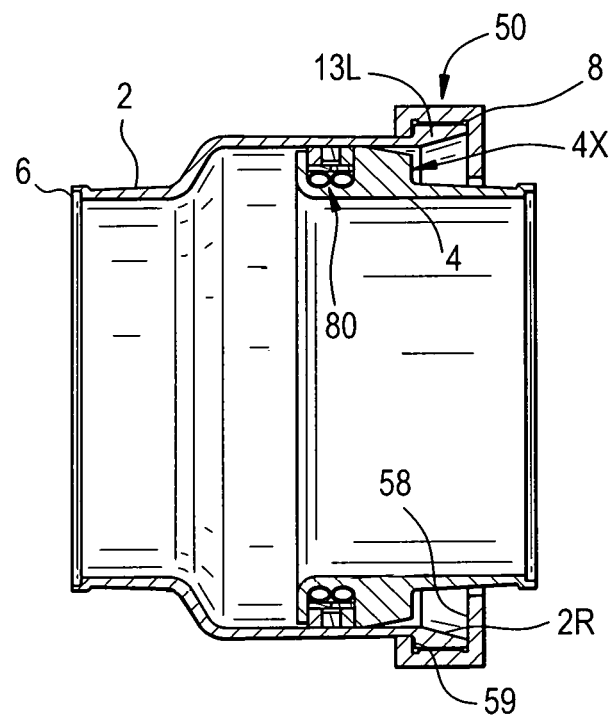
FIG. 6 is an enlarged cross sectional view of one embodiment of the variable-positionable coupling having the clamp of FIG. 5 thereon.
Figure 7:
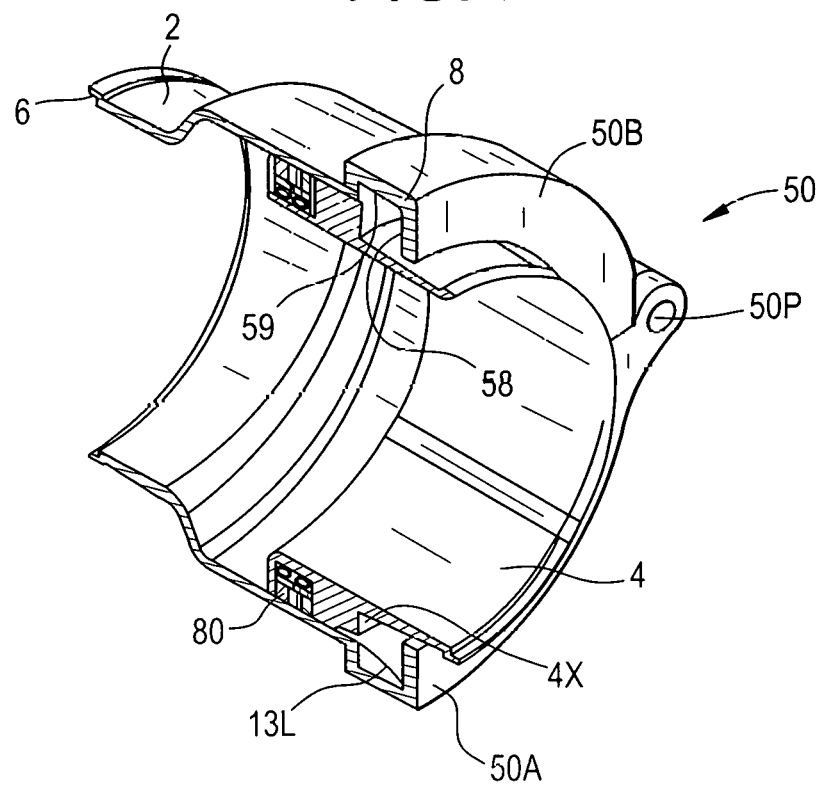
FIG. 7 is a perspective view of the variable-positionable coupling of FIG. 6.

In one embodiment, a retaining clamp 50 is mounted to a portion of one of the variable-positionable couplings, for example, mounted to the first variable-positionable coupling 40A as shown in FIG. 2A. One embodiment of the clamp 50 is illustrated in FIGS. 5, 6 and 7, wherein the clamp 50 is defined by two clamp sections 50A and 50B pivotally coupled to one another about a pivot joint 50P. A bolt 53 and nut 54 pivotally secure the two clamp sections 50A and 50B at the pivot joint 50P. Another bolt 55 extends through a bore 51 of the first clamp section and a bore 52 of the second clamp section 50B to secure the first and second clamp sections 50A and 50B to one another in a closed position. Another nut 56 is threaded on to the bolt 55 to lock the first and second clamp sections 50A and 50B to one another in the closed position. A radially inward facing surface of each of the clamp section 40A and 40B defines a first shoulder 58 and a shorter second shoulder 59 on opposing axial ends of each of the clamp sections 50A and 50B. As shown in FIGS. 6 and 7, the end 8 of the first sleeve 2 of the first variable-positionable coupling 40A has a radially outwardly projecting lobe 13L thereon. The lobe 13L seats between the first shoulder 58 and the second shoulder 59 when the first clamp section 50A and the second clamp section 50B are secured around the first sleeve 2 to limit axial movement of the first sleeve 2 relative to the first seal ring holder 4.

In one embodiment, the first through fourth variable-positionable couplings 40A, 40B, 40C and 40D are configured for sealing an interface between the variable-positionable coupling and a respective one of the supply tube segments 30A, 30B, 30C and 30D or the branch tube segment 20B.

Figure 3:
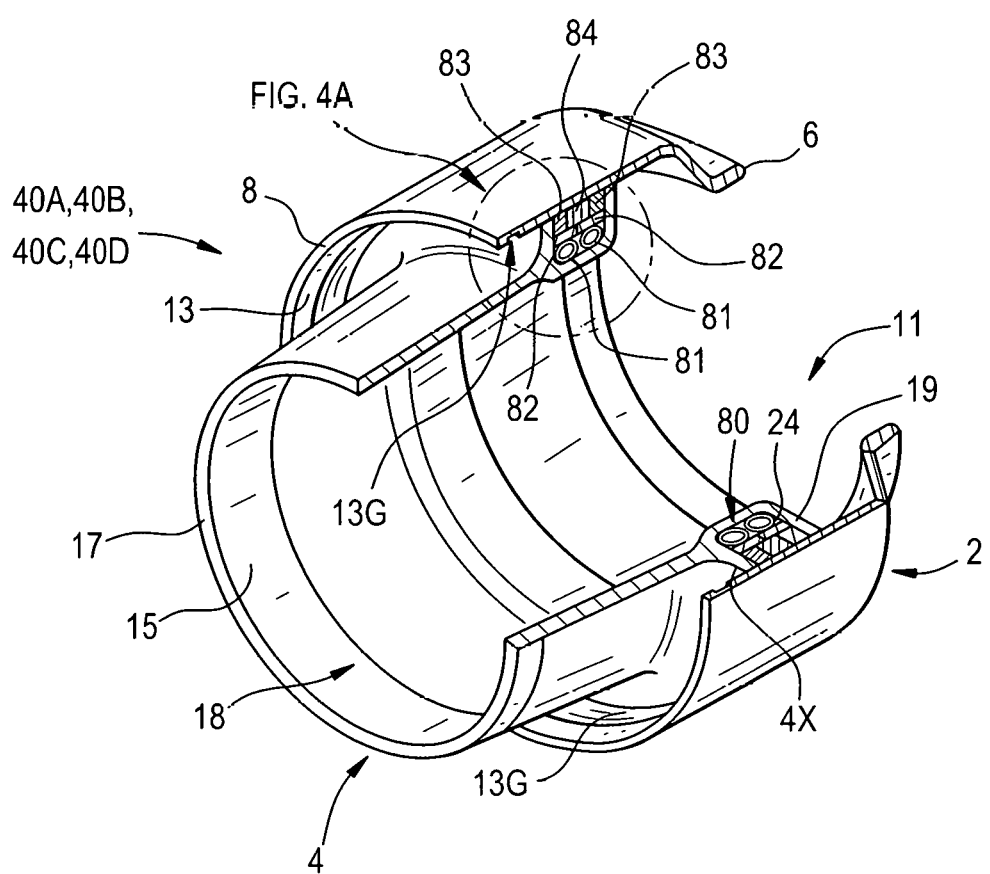
FIG. 3 is a perspective view of one embodiment of a variable-positionable coupling shown with a portion thereof cut away.

In one embodiment, the first through fourth variable-positionable couplings 40A, 40B, 40C and 40D are configured as described and claimed in commonly owned U.S. Pat. No. 7,883,094, the subject matter of which is incorporated by reference herein in its entirety. As shown in FIG. 3, each of the first through fourth variable-positionable couplings 40A, 40B, 40C and 40D as disclosed in U.S. Pat. No. 7,883,094 includes a tubular sleeve 2 and a tubular seal ring holder 4. While the coupling shown is designed for use in a high temperature system, such as an aircraft engine's bleed air system, the coupling may be used in other applications. The sleeve 2 has first and second ends, 6 and 8 respectively. The end 8 forms a circular opening that leads to a cylindrical interior area 11 defined by an interior surface 13 of the sleeve 2.

Figure 4A:
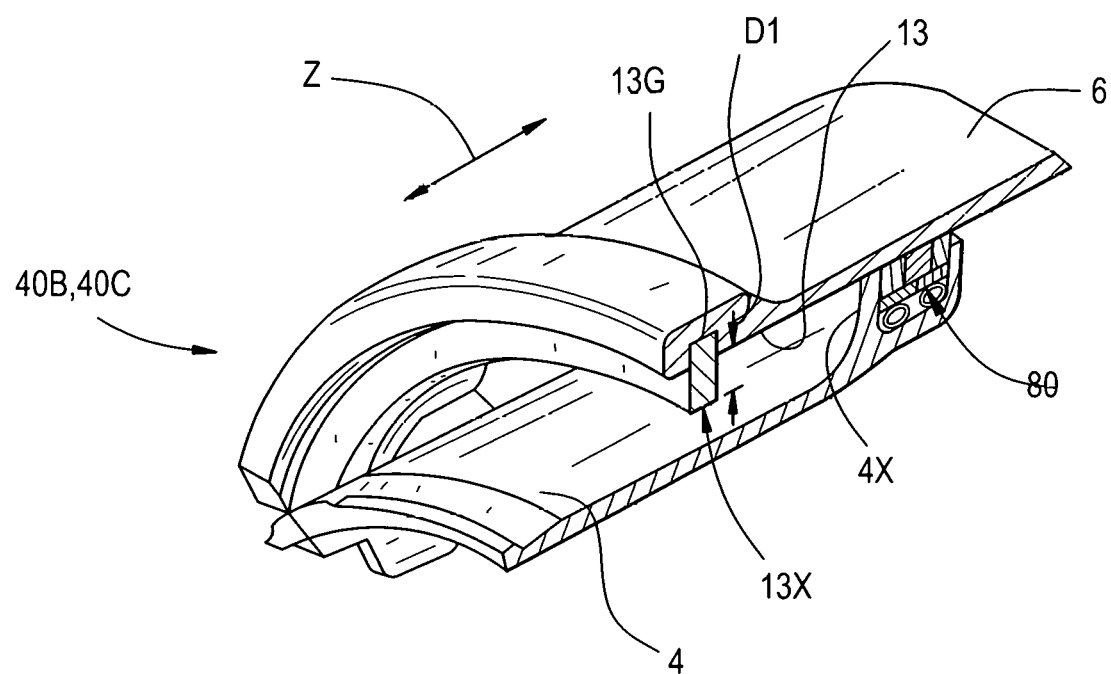
FIG. 4A is a partial cross sectional view of detail 4A portion of the sleeve of FIG. 3.
Figure 4B:
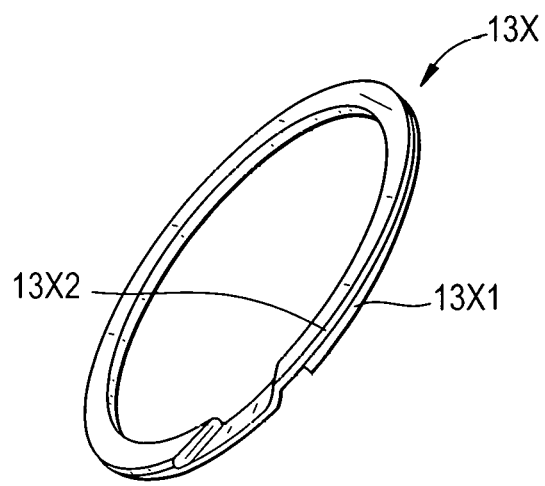
FIG. 4B is an enlarged perspective view of the two turn vertical spiral ring of FIG. 4A.
Figure 4C:
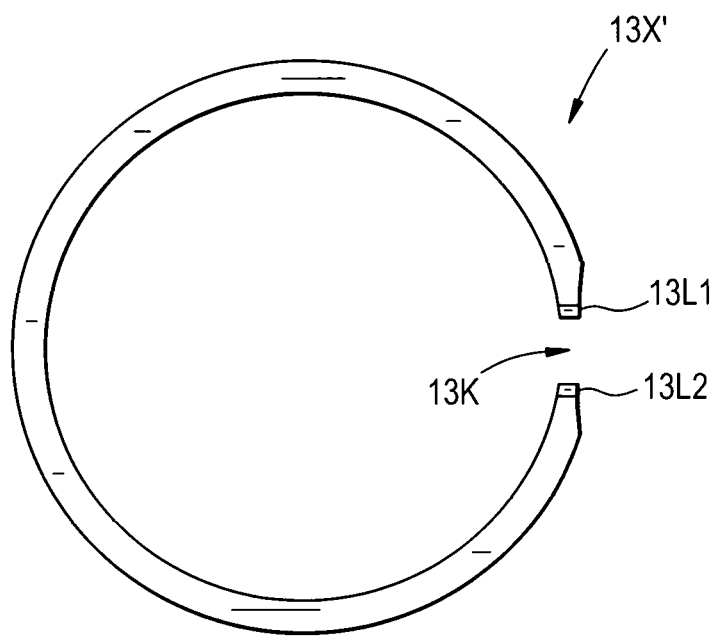
FIG. 4C is a top view of a split locking ring.
Figure 4D:
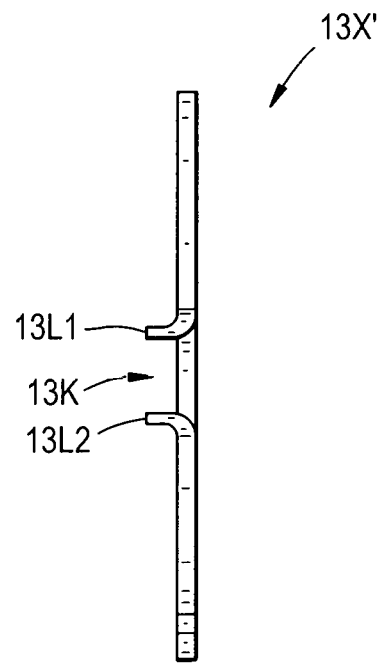
FIG. 4D is a side view of the split locking ring of FIG. 4C.

As shown in FIGS. 3 and 4A, a circumferential groove 13G is formed in the interior surface. A locking ring 13X (e.g., a two turn spiral coil ring) is disposed partially in the groove 13G. As shown in FIG. 4A, the locking ring 13X extends out of the groove 13G in a radially inward direction by a distance Dl. The locking ring 13X is configured to engage a shoulder 4X formed on the seal ring holder 4 to prevent the sleeve 2 limit axial movement of the seal ring holder 4 relative to the sleeve 2, in the directions of the arrow Z. As shown in FIG. 4B, the locking ring 13X is a two turn vertical spiral ring having a first turn 13X1 and a second turn 13X2. The second, third and fourth variable-positionable couplings 40B, 40C utilize the locking ring 13X to limit axial movement of the sleeve 2 relative to the seal ring holder 4. In one embodiment, a split locking ring 13X' as shown in FIGS. 4C and 4D is employed in place of the locking ring 13X. The split locking ring 13X' has two axially extending legs 13L1 and 13L2 extending from the split locking ring 13X' and spaced apart from one another by a gap 13K. The legs 13L1 and 13L2 are urged toward one another during installation in the groove 13G and are subsequently released to allow the split locking ring 13X' to expand into and be seated in the groove 13G. The first variable-positionable coupling 40A does not utilize the locking ring 13X, but instead employs the clamp 50 as described herein with reference to FIGS. 5, 6 and 7. The fourth variable-positionable coupling 40D does not utilize either the locking ring 13X or the clamp 50.

As shown in FIG. 3, the seal ring holder 4 has first and second ends, 17 and 19 respectively. The end 19 forms a circular opening that leads into a cylindrically-shaped interior area 18 defined by an interior surface 15 of the seal ring holder 4. The seal ring holder 4 has an exterior surface 22 that includes a circumferentially-disposed groove 24. As shown, when the coupling is in an assembled condition, the end 19, as well as the groove 24 is located within the interior area 11 of the sleeve 2 and fluid is capable of flowing between areas 11 and 18.

As shown in FIG. 3, located within groove 24 is a seal kit 80. The seal kit 80 includes two canted-coil springs 81 and two expander rings 82. The canted-coil springs 81 engage a bottom surface of the groove 24. The expander rings 82 are positioned radially outwardly of, but in contact with, the canted-coil springs 81. At least partially, and preferably predominantly, located within the groove are two side seal rings 83 and a center seal ring 84. The two side seal rings 83 and the center seal ring 84 are positioned radially outwardly of, but in contact with, the expander rings 82.

As shown in FIG. 2A, the first variable-positionable coupling 40A movably couples the inlet supply tube segment 30A to the downstream-flanged supply tube segment 30B. In particular, the first sleeve 2 of the first variable-positionable coupling 40A is welded to first downstream sleeve end of the inlet tube segment 30A; and the first seal ring holder 4 of the first variable-positionable coupling 40A is welded to a first upstream ring holder end of the downstream-flanged supply tube segment 30B. While the first sleeve 2 of the first variable-positionable coupling 40A is described as being welded to the first downstream sleeve end of the inlet supply tube segment 30A, the present invention is not limited in this regard as the first sleeve 2 of the first variable-positionable coupling 40A may be formed integrally with the inlet supply tube segment 30A via one or more machining operations. While the first seal ring holder 4 is described as being welded to the first upstream ring holder end of the downstream-flanged supply tube segment 30B the present invention is not limited in this regard as the first seal ring holder 4 of the first variable-positionable coupling 40A may be formed integrally with the downstream-flanged supply tube segment 30B via one or more machining operations.

As shown in FIG. 2A, the second variable-positionable coupling 40B movably couples the downstream-flanged supply tube segment 30B to the first flange 60. In particular, the second seal ring holder 4 of the second variable-positionable coupling 40B is welded to a first downstream ring holder end of the downstream-flanged supply tube segment 30B; and the second sleeve 2 of the second variable-positionable coupling 40B is formed (e.g., via machining or casting) integrally with a first upstream sleeve end of a first flange 60. A second flange 61 is disposed on an upstream flange end of the upstream-flanged supply tube segment 30C, for example by welding. The first flange 60 and the second flange 61 are sealably secured to one another by suitable fasteners 63. A seal 64 (e.g., an E-seal) is disposed between the first flange 60 and the second flange 61 to sealingly engage the first flange 60 to the second flange 61. While the second seal ring holder 4 of the second variable-positionable coupling 40B is described as being welded to first downstream ring holder end of the downstream-flanged supply tube segment 30B, the present invention is not limited in this regard as the second seal ring holder 4 of the second variable-positionable coupling 40B may be formed integrally with the downstream-flanged supply tube segment 30B via one or more machining operations. While the second sleeve 2 of the second variable-positionable coupling 40B is described as being welded to first upstream sleeve end of the first flange 60, the present invention is not limited in this regard as the second sleeve 2 of the second variable-positionable coupling 40B may be formed integrally with the first flange 60 via one or more machining operations. While the second flange 61 is described as being welded to the upstream flange end of the upstream-flanged supply tube segment 30C the present invention is not limited in this regard as the second flange 61 may be formed integrally with the upstream-flanged supply tube segment 30C via one or more machining operations.

As shown in FIG. 2A, the third variable-positionable coupling 40C movably couples the upstream-flanged supply tube segment 30C to the downstream supply tube segment 30D. In particular, the third seal ring holder 4 of the third variable-positionable coupling 40C is welded to a second downstream ring holder end of the upstream-flanged supply tube segment 30C; and the third sleeve 2 of the third variable-positionable coupling 40C is welded to a second upstream sleeve end of the downstream supply tube segment 30D. While the third seal ring holder 4 of the third variable-positionable coupling 40C is described as being welded to the second downstream ring holder end of the upstream-flanged supply tube segment 30C, the present invention is not limited in this regard as the third seal ring holder 4 of the third variable-positionable coupling 40C may be formed integrally with the upstream-flanged supply tube segment 30C via one or more machining operations. While the third sleeve 2 of the third variable-positionable coupling 40C is described as being welded to the second upstream sleeve end of the downstream supply tube segment 30D, the present invention is not limited in this regard as the third sleeve 2 of the third variable-positionable coupling 40C may be formed integrally with the downstream supply tube segment 30D via one or more machining operations.

As shown in FIG. 2A, the fourth variable-positionable coupling 40D movably couples the downstream supply tube segment 30D to the branch tube segment 20B. In particular, the fourth sleeve 2 of the fourth variable-positionable coupling 40D is welded to a second downstream sleeve end of the downstream supply tube segment 30D, and the fourth seal ring holder 4 of the fourth variable-positionable coupling 40D is welded to a second upstream ring holder end of the branch tube segment 20B. While the fourth sleeve 2 of the fourth variable-positionable coupling 40D is described as being welded to the second downstream sleeve end of the downstream supply tube segment 30D the present invention is not limited in this regard as the fourth sleeve 2 of the fourth variable-positionable coupling 40D may be formed integrally with the downstream supply tube segment 30D via one or more machining operations. While the fourth seal ring holder 4 of the fourth variable-positionable coupling 40D is described as being welded to the second upstream ring holder end of the branch tube segment 20B the present invention is not limited in this regard as the fourth seal ring holder 4 of the fourth variable-positionable coupling 40D may be formed integrally with the branch tube segment 20B via one or more machining operations.

Figure 2B:
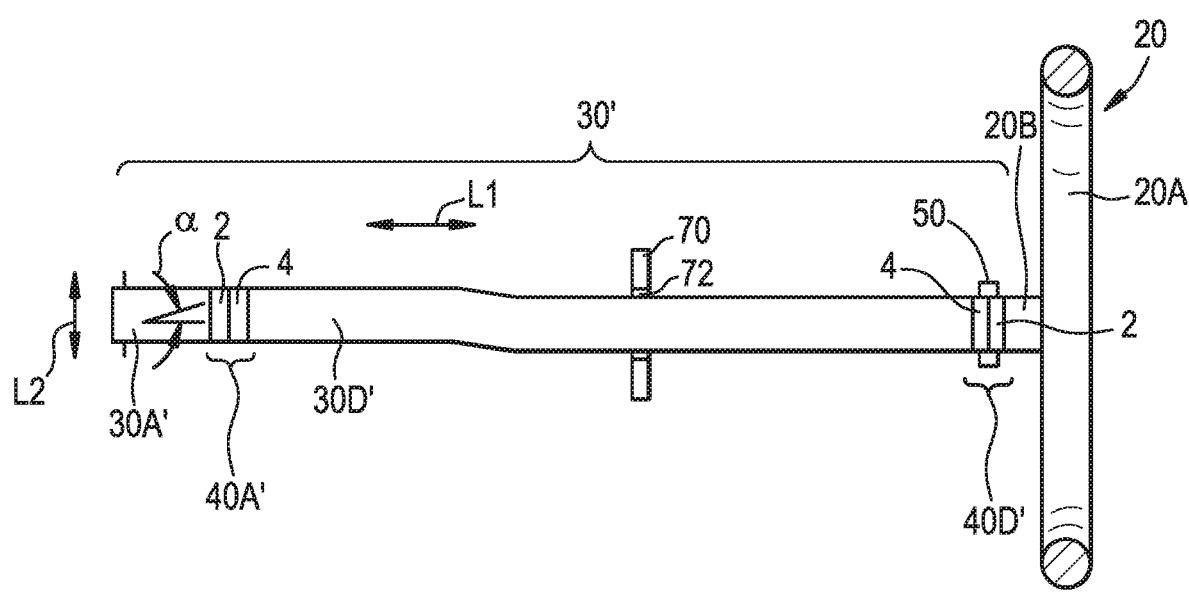
FIG. 2B is a schematic of a tubing assembly that is movably coupled to the Coanda ring using two variable-positionable couplings.

While FIG. 2A illustrates the Coanda assembly having the inlet supply tube segment 30A, the downstream-flanged supply tube segment 30B, the upstream-flanged supply tube segment 30C, the downstream supply tube segment 30D, the annular tube segment 20A, the branch tube segment 20B and the first through fourth 40A, 40B, 40C and 40D variable-positionable couplings, the present invention is not limited in this regard as other Coanda assemblies and tube connection systems may be employed having any number of supply tube segments, annular supply tube segments, branch supply tube segments and variable-positionable couplings, of various configurations. For example, FIG. 2B illustrates a supply tube assembly 30' that includes an inlet supply tube segment (e.g., forward segment) 30A movably coupled to a downstream supply tube segment 30B by a first variable-positionable coupling 40A'. In one embodiment, the inlet supply tube segment 30A has a flange 71 secured thereto (e.g., welded to or machined integrally therewith) for securing the inlet supply tube segment 30A to another structure and/or other tube. The downstream supply tube segment 30B is movably coupled to a branch tube segment 20B (e.g., a Y-duct or T-tube segment) extending from an annular tube segment 20A of the Coanda ring by a second variable-positionable coupling 40D'. The first variable-positionable coupling 40A' and the second variable-positionable 40D' provide sealing movement between the respective inlet supply tube segment 30A, the downstream supply tube segment 30B and the branch tube segment 20B to compensate for lateral, angular and rotational movement; and structural, dynamic and vibration loads. The inlet supply tube segment 30A, the downstream supply tube segment 30B, the annular tube segment 20A, the branch tube segment 20B and the first and second variable-positionable couplings 40A' and 40D', respectively, are collectively referred to herein as a Coanda assembly.

The first and second variable-positionable couplings 40A' and 40D' are each configured for axial articulations to compensate for thermally induced movement, lateral articulations to compensate for misalignment of the supply tube segments and/or conical articulation to compensate for flexions and dynamic loads. The first and second variable-positionable couplings 40A' and 40D' are each configured to seal an interface between the respective variable-positionable couplings and at least one of the tube segments and the branch tube segments.

Referring to FIG. 2B, the inlet supply tube segment 30A' is axially movable in relation to the downstream supply tube segment 30D' in a direction indicted by the arrow L1. The downstream supply tube segment 30D' is axially movable in relation to the branch tube segment 20B in the direction indicated by the arrow L1. In one embodiment, the inlet supply tube segment 30A' and the downstream supply tube segment 30D' are axially movable by plus or minus 6.35 mm (0.25 inches) minimum to plus or minus 25.4 mm (1.0 inches) maximum.

Referring to FIG. 2B, the inlet supply tube segment 30A' and downstream supply tube segment 30D' are laterally movable in relation to each other in a direction indicted by the arrow L2. The downstream supply tube segment 30D' is laterally movable in relation to the branch tube segment 20B in the direction indicated by the arrow L2. In one embodiment, inlet supply tube segment 30A' and the downstream supply tube segment 30D' are laterally movable by plus or minus a minimum of 6.35 mm (0.25 inches).

Referring to FIG. 2B, the inlet supply tube segment 30A' and the downstream supply tube segment 30D' are angularly movable (e.g., conical movement) in relation to each other in a direction indicted by the angle α. The downstream supply tube segment 30D' is angularly movable in relation to the branch tube segment 20B in the direction indicated by the angle α. In one embodiment, the inlet supply tube segment 30A' and the downstream supply tube segment are angularly movable by up to 5 degrees in a conical twisting manner.

In one embodiment shown in FIG. 2B, the retaining clamp 50 is mounted to a portion of one of the variable-positionable couplings, for example, mounted to the second variable-positionable coupling 40D' as shown in FIG. 2B.

In one embodiment, the first and second variable-positionable couplings 40A' and 40D', respectively, are configured for sealing an interface between the respective variable-positionable coupling and a respective one of the inlet supply tube segment 30A', the downstream supply tube segment 30D' or the branch tube segment 20B.

In one embodiment, the first variable-positionable coupling 40A' and the second variable-positionable coupling 40D' are configured as described and claimed in commonly owned U.S. Pat. No. 7,883,094, the subject matter of which is incorporated by reference herein in its entirety. As shown in FIG. 3 each of the first variable-positionable coupling 40A' and the second variable-positionable coupling 40D' as disclosed in U.S. Pat. No. 7,883,094 includes a tubular sleeve 2 and a tubular seal ring holder 4.

As shown in FIG. 2B, the first variable-positionable coupling 40A' movably couples the inlet supply tube segment 30A' to the downstream supply tube segment 30D'. In particular, the first sleeve 2 of the first variable-positionable coupling 40A' is welded to a downstream sleeve end of the inlet supply tube segment 30A'; and the first seal ring holder 4 of the first variable-positionable coupling 40A' is welded to an upstream ring holder end of the downstream supply tube segment 30D'. While the first sleeve 2 of the first variable-positionable coupling 40A' is described as being welded to the downstream sleeve end of the inlet supply tube segment 30A', the present invention is not limited in this regard as the first sleeve 2 of the first variable-positionable coupling 40A' may be formed integrally with the inlet supply tube segment 30A' via one or more machining operations. While the first seal ring holder 4 is described as being welded to the upstream ring holder end of the downstream supply tube segment 30D' the present invention is not limited in this regard as the first seal ring holder 4 of the first variable-positionable coupling 40A' may be formed integrally with the downstream supply tube segment 30D' via one or more machining operations.

As shown in FIG. 2B, the second variable-positionable coupling 40D' movably couples the downstream supply tube segment 30D' to the branch tube segment 20B. In particular, the second sleeve 2 of the second variable-positionable coupling 40D' is welded to an upstream sleeve end of the branch tube segment 20B and the second seal ring holder 4 of the second variable-positionable coupling 40D' is welded to a downstream ring holder end of the downstream supply tube segment 30D'. While the second seal ring holder 4 of the second variable-positionable coupling 40D' is described as being welded to the downstream ring holder end of the downstream supply tube segment 30D' the present invention is not limited in this regard as the second seal ring holder 4 of the second variable-positionable coupling 40D' may be formed integrally with the downstream supply tube segment 30D' via one or more machining operations. While the second sleeve 2 of the second variable-positionable coupling 40D' is described as being welded to the upstream sleeve end of the branch tube segment 20B, the present invention is not limited in this regard as the second sleeve 2 of the second variable-positionable coupling 40D' may be formed integrally with the branch tube segment 20B via one or more machining operations.

As shown in FIG. 2B, the downstream supply tube segment 30D' has a bracket 70 for securing the downstream supply tube segment 30D' to another structure. A flexible ring 72 (e.g., a silicon ring) is positioned around the downstream supply tube segment 30D' and in a radially inward facing surface of the flange 70 to dampen vibrations and heat transfer between the downstream supply tube segment 30D' and the other structure.

In one embodiment, the inlet supply tube segment 30A, the downstream-flanged supply tube segment 30B, the upstream-flanged supply tube segment 30C, the downstream supply tube segment 30D and/or the branch tube segment 20B is manufactured from a austenite nickel-chromium-based superalloy for example, Inconel® 625 (Inconel® is a registered trademark of Special Metals Corporation). In one embodiment, the sleeves 2 and/or the seal ring holders 4 are manufactured from an austenitic stainless steel such as a 347 stainless steel. In one embodiment, the respective sleeve 2 and/or the respective seal ring holder 4 is welded to the respective one of the inlet supply tube segment 30A, the downstream-flanged supply tube segment 30B, the upstream-flanged supply tube segment 30C, the downstream supply tube segment 30D or the branch tube segment 20B via a bimetallic weld. In one embodiment, the seal kit 80 is configured for high temperature operation in excess of 600 degrees Fahrenheit. In one embodiment, the first through fourth 40A, 40B, 40C and 40D variable-positionable couplings are configured as described and claimed in commonly owned U.S. Pat. No. 6,905,144, the subject matter of which is incorporated by reference herein in its entirety.

In one embodiment, the first through fourth 40A, 40B, 40C and 40D variable-positionable couplings provide vibration dampening. In one embodiment, the first through fourth 40A, 40B, 40C and 40D variable-positionable couplings include metal seals capable of withstanding high pressures (e.g., in excess of 400 psi) and temperatures (e.g., in excess of 900 degrees Fahrenheit) that exist in the exhaust gas K1 of the engine 14 while maintaining sealing and allowing the axial, lateral and angular movements disclosed herein. In one embodiment, the first through fourth variable-positionable couplings 40A, 40B, 40C and 40D are configured to withstand pressures of 1200 psi at 1300 degrees Fahrenheit. In one embodiment, each of the first through fourth variable-positionable couplings 40A, 40B, 40C and 40D are configured to leak no more than 0.08 lb/min per inch diameter of the variable-positionable couplings 40A, 40B, 40C and 40D at the 400 psi and 900 degrees Fahrenheit for a total leakage of 0.036 for all four of the first through fourth variable-positionable couplings 40A, 40B, 40C and 40D. In one embodiment, the nominal leakage for each of the first through fourth variable-positionable couplings 40A, 40B, 40C and 40C is about 0.01 lb/min per inch diameter of the variable-positionable couplings 40A, 40B, 40C and 40D. In one embodiment, the nominal leakage for each of the first through fourth variable-positionable couplings 40A, 40B, 40C and 40D is about 0.02 lb/min per inch diameter of the variable-positionable couplings 40A, 40B, 40C and 40D.

In one embodiment, one or more of the first through fourth 40A, 40B, 40C and 40D variable-positionable couplings are a blind installation assembly. In one embodiment, two of the first through fourth 40A, 40B, 40C and 40D variable-positionable couplings are blind installation assemblies. As shown in FIG. 2A blind installation assemblies are employed for the first and fourth variable-positionable couplings 40A and 40D. Blind installation as used herein refers to a method and configuration of coupling one of the seal ring holders 4 to a respective one of the sleeves 2 without a visible line of sight to the sleeve 2. For example, a blind installation assembly is employed when coupling the first seal ring holder 4 to the first sleeve 2 welded to the inlet supply tube segment 30A because the inlet supply tube segment 30A is installed in the nacelle 10 behind obstructions such as structural members and/or insulation. For example, a blind installation assembly is employed when coupling the fourth seal ring holder 4 to the fourth sleeve 2 welded to the branch tube segment 20B because the branch tube segment 20B is installed in the nacelle 10 behind obstructions such as structural members and/or insulation. In one embodiment, the blind installation assembly employs an outwardly expanding conical ramp 2R (see FIG. 6) on a radially inward facing surface (e.g., a spherical, arcuate or otherwise contoured surface) of the sleeve 2 to facilitate sliding of the mating portion of the seal ring holder 4 into the interior area 11 of the sleeve 2.

In one embodiment, the seal kit 80 is field replaceable.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A tube connection system for an aircraft or engine, the tube connection system comprising:
  a sequential arrangement of tube segments comprising:
   an upstream-flanged supply tube segment having a first downstream ring holder end;
   a downstream supply tube segment having a first upstream sleeve end and a first downstream sleeve end;
  at least two variable-positionable couplings, each of the variable-positionable couplings comprising a ring holder having a groove accommodating at least two seal rings and a sleeve that surrounds the groove and the at least two seal rings;
  the upstream-flanged supply tube segment being movably coupled to the downstream supply tube segment by a first of the variable-positionable couplings such that a first of the ring holders is positioned on the first downstream ring holder end of the upstream-flanged-supply tube segment, and a first of the sleeves is positioned on the first upstream sleeve end of the downstream supply tube;

an annular tube segment having at least one branch tube segment extending therefrom, the branch tube segment having a first upstream ring holder end;

the downstream supply tube segment being movably coupled to the at least one branch tube segment by a second of the variable-positionable couplings such that a second of the sleeves is positioned on the first downstream sleeve end of the downstream supply tube segment and a second of the ring holders is positioned on the first upstream ring holder end of the branch tube segment, and wherein the tube connection system is configured for operation at temperatures greater than 600 degrees Fahrenheit.

2. The tube connection system of claim 1, wherein the upstream-flanged supply tube segment is axially movable in relation to the downstream supply tube segment.

3. The tube connection system of claim 1, wherein at least one of the upstream-flanged supply tube segment and the downstream supply tube segment is axially movable in relation to the branch tube segment.

4. The tube connection system of claim 1, wherein the upstream-flanged supply tube segment is laterally movable in relation to of the downstream supply tube segment.

5. The tube connection system of claim 1, wherein at least one of the upstream-flanged supply tube segment and the downstream supply tube segment is laterally movable in relation to the branch tube segment.

6. The tube connection system of claim 1, wherein each of the upstream-flanged supply tube segment and the downstream supply tube segment is angularly movable in relation to an adjacent supply tube segment.

7. The tube connection system of claim 1, wherein at least one of the upstream-flanged supply tube segment and the downstream supply tube segment is angularly movable in relation to the branch tube segment.

8. The tube connection system of claim 1, further comprising a retaining clamp mounted to a portion of at least one of the two variable-positionable couplings.

9. The tube connection system of claim 1, wherein axial movement of the upstream-flanged supply tube segment relative to the downstream supply tube segment or the downstream supply tube segment relative to the branch tube segment is limited by one of a clamp and a locking ring.

10. The tube connection system of claim 1, wherein two of the at least two variable-positionable couplings each comprise a sealing system comprising:

at least one canted-coil spring and two expander rings, the canted-coil spring engaging a bottom surface of a groove formed in the seal ring holder, the expander rings being positioned radially outwardly of and in contact with, the canted-coil spring, wherein the at least two seal rings in each of the two variable-positionable couplings comprise two side seal rings and a center seal ring being positioned in the groove radially outwardly and in contact with the expander rings and the sleeve mating surface, and the center seal ring is positioned between the two side seal rings.

11. The tube connection system of claim 10, wherein the at least one canted-coil springs and two expander rings exert a radially outward force in a static state, the two side seal rings and center ring exert a radially outward force in a dynamic state, and the dynamic state is in response to a change in pressure around the sealing system.

12. The tube connection system of claim 1, wherein at least one of the at least two variable-positionable couplings is configured for at least one of:

axial articulations to compensate for thermally induced movement;

lateral articulations to compensate for misalignment of the upstream-flanged supply tube segment, the downstream supply tube segment, and the branch tube segment; and conical articulations to compensate for flexions and dynamic loads, applied thereto.

13. The tube connection system of claim 1, wherein at least one of:

the first of the ring holders is secured to the first downstream ring holder end of the upstream-flanged supply tube segment via welding or brazing;

the first of the sleeves is secured to the first upstream sleeve end of the downstream supply tube segment via welding or brazing;

the second of the sleeves is secured to the first downstream sleeve end of the downstream supply tube segment via welding or brazing; and the second of the ring holders is secured to the first upstream ring holder end of the branch tube segment via welding or brazing.

14. The tube connection system of claim 1, wherein at least one of:

the first of the ring holders is integral with the first downstream ring holder end of the upstream-flanged supply tube segment;

the first of the sleeves is integral with the first upstream sleeve end of the downstream supply tube segment;

the second of the sleeves is integral with the first downstream sleeve end of the downstream supply tube segment; and the second of the ring holders is integral with the first upstream ring holder end of the branch tube segment.

15. The tube connection system of claim 1, wherein the upstream-flanged supply tube segment connects to a second flange at an upstream flange end.

16. The tube connection system of claim 15, further comprising:

a downstream-flanged supply tube segment having a second upstream ring holder end and a second downstream ring holder end;

a first flange having a second upstream sleeve end; and the downstream-flanged supply tube segment connecting to the first flange by a third of the at least two variable positionable couplings such that a third of the ring holders is positioned on the second upstream ring holder end of the downstream-flanged supply tube segment and a third of the sleeves is positioned on the second upstream sleeve end of the first flange, wherein the second flange sealingly engages the first flange.

17. The tube connection system of claim 16, further comprising an inlet supply tube segment having a second downstream sleeve end, the inlet supply tube segment being movably coupled to the downstream-flanged supply tube segment by a fourth of the at least two variable-positionable couplings such that a fourth of the ring holders is positioned on the second upstream ring holder end of the downstream-flanged supply tube segment and a fourth of the sleeves is positioned on the second downstream sleeve end of the inlet supply tube segment.

18. The tube connection system of claim 1, wherein one of the supply tube segments is axially and angularly movable in relation to an adjacent one of the supply tube segments.

19. The tube connection system of claim 1, wherein one of the supply tube segments is axially and angularly movable in relation to the branch tube segment.

20. The tube connection system of claim 1, wherein a third of the at least two variable-positionable couplings comprises a blind installation assembly defined by the first downstream sleeve end of the downstream supply tube segment having an outwardly expanding conical ramp.

21. A tube connection system for an aircraft or engine, the tube connection system comprising:
   a sequential arrangement of tube segments comprising:
      an inlet supply tube segment having a first downstream sleeve end;
      a downstream-flanged supply tube segment having a first upstream ring holder end and a first downstream ring holder end;
      a first flange having a first upstream sleeve end;
      an upstream-flanged supply tube segment having an upstream flange end and a second downstream ring holder end, the upstream flange end having a second flange connected thereto;
      a downstream supply tube segment having a second upstream sleeve end and a second downstream sleeve end;
      an annular tube segment having a branch tube segment extending therefrom, the branch tube segment having a second upstream ring holder end;
      four variable-positionable couplings, each of the variable positionable couplings comprising a ring holder having a groove accommodating at least two seal rings and a sleeve that surrounds the groove and the at least two seas rings;
      the inlet supply tube segment Movably coupled to the downstream-flamed supply tube segment by a first of the four variable-positionable couplings such that a first of the sleeves is positioned on the first downstream sleeve end of the inlet supply tube segment and a first of the ring holders is positioned on the first upstream ring holder end of the downstream-flanged supply tube segment;
      the downstream-flanged supply tube segment movably coupled to the first flange by a second of the four variable-positionable couplings such that a second of the ring holders is positioned on the first downstream ring holder end of the downstream-flanged supply tube segment and a second of the sleeves is positioned on the first upstream sleeve end of the first flange;
      the upstream-flamed supply tube segment movably coupled to the downstream supply tube segment by a third of the four variable-positionable couplings such that a third of the ring holders is positioned on the second downstream ring holder end of the upstream-flanged supply tube segment and a third of the sleeves is positioned on the second upstream sleeve end of the downstream supply tube segment; and
      the downstream supply tube segment movably coupled to the branch tube segment by a fourth of the four variable-positionable couplings such that a fourth of the sleeves is positioned on the second downstream sleeve end of the downstream supply tube segment and a fourth of the ring holders is positioned on the second upstream ring holder end of the branch tube segment,
   wherein the first flange sealingly engages the second flange, and
   wherein the tube connection system is configured for operation at temperatures greater than 600 degrees Fahrenheit.

22. The tube connection system of claim 21, wherein the first of the four variable-positionable couplings comprises a blind installation assembly defined by the first downstream sleeve end of the inlet tube segment having an outwardly expanding conical ramp.

23. The tube connection system of claim 21, wherein the third of the four variable-positionable couplings comprises a blind installation assembly defined by the second upstream sleeve end of the downstream supply tube segment having an outwardly expanding conical ramp.

24. A tube connection system for an aircraft or engine, the tube connection system comprising:
   a sequential arrangement of tube segments comprising:
      an inlet supply tube segment having a downstream sleeve end;
      a downstream supply tube segment having an upstream holder end and a downstream ring holder end;
      an annular tube segment having a branch tube segment extending therefrom, the branch tube segment having an upstream sleeve end; and
      two variable-positionable couplings, each of the variable-positionable couplings comprising a ring holder having a groove accommodating at least two seal rings and a sleeve that surrounds the groove and the at least two seal rings,
   wherein the inlet supply tube segment being movably coupled to the downstream supply tube segment by a first of the two variable-positionable couplings such that a first of the sleeves is positioned on the downstream sleeve end of the inlet supply tube segment and a first of the ring holders is positioned on the upstream ring holder end of the downstream supply tube segment,
   wherein the branch tube segment being movably coupled to the downstream supply tube segment by a second of the two variable-positionable couplings such that a second of the ring holders is positioned on the downstream ring holder end of the downstream supply tube segment and a second of the sleeves is positioned on the upstream sleeve end of the branch tube segment, and
   wherein the tube connection system is configured for operation at temperatures greater than 600 degrees Fahrenheit.

25. The tube connection system of claim 24, further comprising a bracket supporting a flexible ring securing the downstream supply tube segment to another structure.

26. A tube connection system for an aircraft or engine, the tube connection system comprising:
   a sequential arrangement of tube segments comprising:
      an inlet supply tube segment having a downstream sleeve end;
      a downstream-flanged supply tube segment having an upstream ring holder end and a downstream ring holder end;
      a first flange having an upstream sleeve end;
      an upstream-flanged supply tube segment having an upstream flange end having a second flange connected thereto; and two variable-positionable couplings each comprising a ring holder having a groove accommodating at least two seal rings and a sleeve that surrounds the groove and the at least two seal rings, wherein the inlet supply tube segment being movably coupled to the downstream-flanged supply tube segment by a first of the two variable-positionable coupling such that a first of the sleeves is positioned on the downstream sleeve end of the inlet supply tube and a first of the ring holders is positioned on the upstream ring holder end of the downstream-flanged supply tube segment, wherein the downstream-flanged supply tube segment being movably coupled to the first flange by a second of the two variable-positionable couplings such that a second of the ring holders is positioned on the downstream ring holder end of the downstream-flanged supply tube segment and a second of the sleeves is positioned on the upstream sleeve end of the first flange, wherein the first flange sealingly engages the second flange, and wherein the tube connection system is configured for operation at temperatures greater than 600 degrees Fahrenheit.

\* \* \* \* \*